United States Patent Office 3,595,736
Patented July 27, 1971

3,595,736
UNIAXIALLY ORIENTED FILMS AND TAPES
Richard Harold Barclay Buteux, Welwyn Garden City, England, assignor to Imperial Chemical Industries Limited, London, England
No Drawing. Filed Apr. 27, 1967, Ser. No. 634,079
Claims priority, application Great Britain, May 26, 1966, 23,578/66
Int. Cl. B29d 7/00
U.S. Cl. 161—165                    4 Claims

ABSTRACT OF THE DISCLOSURE

Uniaxially drawn films and tapes of polyethylene-1:2-diphenoxy-4:4'-dicarboxylate having in the direction of drawing tensile strength of at least 20,000 p.s.i. and moduli of at least $0.8 \times 10^6$ p.s.i. and processes for their production. The films and tapes are useful in many applications, particularly as a magnetic recording tape base.

---

This invention relates to new oriented films and tapes and to processes for their production.

For many applications thermoplastic films or tapes are required which combine a very high tensile yield strength in their longitudinal direction with sufficiently high strength in the transverse direction so that they can be used without e.g. fibrillating. Such films and tapes have been produced from polyethylene terephthalate but the processes used for producing such films are expensive since the amorphous polyethylene terephthalate must be drawn at least to some degree in the transverse direction in order that the resultant film may have adequate strength in that direction. Further, stiffer stronger films or tapes than those produced from polyethylene terephthalate would allow the use of thinner gauges with resultant economy of material and, as is important in applications which involve many superposed layers, e.g. magnetic recording tapes, capacitors or typewriter ribbons, economy of space. Improvements in stiffness and strength also in themselves extend to improve the applications to which film or tape may be put.

It is an object of the present invention to produce such stiffer, stronger films and tapes.

A further object is to provide a simple process for their production.

According to the present invention we provide films and tapes of polyethylene - 1:2 - diphenoxyethane-4:4'-dicarboxylate having in their longitudinal direction tensile yield strengths of at least 20,000 p.s.i. preferably at least 45,000 p.s.i. and moduli in bend of at least $0.8 \times 10^6$ p.s.i. preferably at least $1.8 \times 10^6$ p.s.i. coupled with a tensile yield strength in their transverse direction of at least 3,000 p.s.i. and preferably with a shrinkage when heated for 1 minute at 200° C. of less than 1%, in the longitudinal direction of the film or tape.

These films or tapes may be produced by a process in which an appropriately thick polyethylene - 1:2 - diphenoxyethane-4:4'-dicarboxylate layer depending on the draw ratio used is cold drawn, i.e. in the solid state, at least two times in its longitudinal direction and the film or tape is not broken, the drawing being at a temperature which allows the film or tape to draw without the formation of voids but with a change of the refractive index of the film or tape, the layer being preferably maintained before it is drawn at a temperature sufficient to cause the polymer to crystallise.

The polymeric layers used for the production of the films of our invention are preferably produced by extrusion from a slot die, although an annular die could also be used.

Crystallisation of the layers depends on the temperature and time of heating. For normal rates of continuous handling of polymer films temperatures of 80 to 125° C. are sufficient for this treatment, the time required for the treatment being less for higher temperatures. However, higher temperatures up to near the melting point of the polymer (about 245° C.) are normally used since the drawn film or tape shows a tendency to fibrillate if heated after drawing to temperatures greater than those at which it was crystallised before drawing, the greater the draw ratio used, the greater being the tendency to fibrillate. Suitable heat setting temperatures which are used before drawing the film are thus between 150° C. and 220° C. and preferably between 200° C. and 220° C.

Film or tape produced by extrusion which is not to be crystallised should be quenched to a temperature below 80° C., preferably to below 60° C., after extrusion. Film produced by extrusion which is to be crystallised may also be solidified after extrusion at these temperatures but a temperature above 60° C. and preferably a temperature in the range 80–125° C. may in this case be used, thus accomplishing the crystallisation, the temperature in either case being raised again to 150° C. to 220° C. after solidification to ensure that the drawn film will not fibrillate at elevated temperatures.

So that the films have particularly high tensile yield strengths and moduli, we prefer that they are drawn at least 4 times. The maximum draw ratio which can be applied without breaking the layers depends on the molecular weight of the polymer but draw ratios of 5 times and greater can readily be achieved to produce film having a tensile yield stress of at least 60,000 p.s.i. and a modulus of at least $2.2 \times 10^6$ p.s.i. We measure the molecular weight of the polymer by measuring its relative viscosity as a 1% solution in o-chlorophenol. We prefer that it has such a relative viscosity of at least 1.9 and particularly one of at least 2.0. Such relative viscosities as low as 1.7 are quite satisfactory. However such relative viscosities above 2.5 are not desirable because unduly high extrusion temperatures are required causing some polymer degradation and also because the cost of producing the polymer is increased. The maximum draw ratio depends on the drawing temperature and rate of drawing, as well as molecular weight and crystalline state of the film or tape. Crystallised films or tapes require a low draw ratio to effect an equal degree of orientation as shown by change of refractive index in the direction of drawing and by improvement in the tensile strength of the films or tapes. Under comparable conditions crystallised layers can only be drawn to somewhat lower draw ratios than uncrystallised layers without breaking.

The higher the rate of draw the higher the temperature required to obtain void-free film or tape.

For normal commercial rates of drawing for uncrystallised layers, the temperature of drawing should be at least 70° C. For high rates of such drawing 80° C. is a suitable minimum temperature for such draws. Crystalline layers are best drawn at higher temperatures. If the layers are drawn at unduly high temperatures the solid polymer flows as well as orients, e.g. at temperatures of the order of 180° C., i.e. the draw only partially effects a change of refractive index in the film or tape and improvement in its mechanical properties. In general we find it unnecessary to draw at temperatures above 150° C.

The films and tapes of our invention are preferably of the non-tubular variety and are preferably made by non-tubular processes although they could be made by slitting seamless tubular film made by a tubular process.

We find that the crystallised layers can be drawn to higher tensile yield strengths and stiffness than uncrystallised layers. For the operation of a tubular process for the production of layers for producing our films a cooling die is normally required, because of the mobile nature of the polymer. Because tubular processes are not best suited to the production of our films or tapes and because, in any case, they do not give the best thickness uniformity and flatness, our films and tapes are preferably prepared from flat layers by drawing, e.g. between sets of "fast" and "slow" rollers. Narrow tapes may be produced by slitting a relatively wide, oriented, film but such narrow tapes may also be produced by extrusion of a narrow undrawn tape or by extrusion of a relatively wide film which is first slit and then drawn to produce a plurality of narrow, drawn tapes. These methods are also very suitable for the production of transparent film or tape particularly when the layers formed for drawing are quenched after extruding at relatively high extrusion temperatures, e.g. from 300 to 330° C., preferably from 310–315° C. Such quenched layers may also be used for the production of transparent crystallised film or tape.

Thus our preferred process for the production of films or tapes according to our invention and having a shrinkage when heated to 200° C. for 1 minute of less than 1%, comprises extruding the film maintaining the solidified film at a temperature of from 150° C. to 220° C. and drawing the film at least two, preferably at least four, times.

Our films or tapes exhibit good resistance to ultra-violet light degradation compared with polyethylene terephthalate. For example the tensile yield stress of our film was only reduced to 85% of its initial value after exposure to ultra-violet light for 1,000 hours whereas the tensile yield stress of polyethylene terephthalate film under the same conditions was reduced to 50% of its initial value. Our films and tapes also exhibited resistance to continued exposure to high temperatures and for example after 8 days at 170° C. had only lost 30% of their original tensile yield strength.

Various additives, e.g. fillers comprising finely divided particulate materials, dyes, pigments, light stabilisers or antistatic agents, may be incorporated in the film or tapes according to our invention. Examples of suitable fillers include titanium dioxide, silica (including diatomaceous silica), silicates and alumino-silicates, e.g. clays, abrasives such as powdered glass or Carborundum and decorative materials such as talc, ground mica or ground mother-of-pearl.

The concentration of the additive and, in the case of solid materials, its particle size, will depend on the nature of the additive and the purpose for which the film or tape is to be used. For example, in the case of a pigment or dye we prefer the concentration to be from 0.01% to 5.0% by weight. In the case of a filler such as silica or a silicate which confers a matte "write-on" surface to the film or tape, from 1% to 10% by weight and or particle size from 0.1 to 10 microns may be added. In the case of a substance, e.g. clay, added to improve the slip properties of the film or tape, the preferred concentration is from 0.5% to 5.0% by weight and the preferred particle size from 0.01 to 10 microns. In the case of decorative materials the preferred concentration of inert filler is from 1% to 15% by weight and the preferred particle size from 1 to 20 microns. In the case of abrasive, e.g. ground glass or Carborundum, concentrations of from 1% to 15% by weight and particle sizes of from 0.05 inch to 0.100 inch may be used. For application where the film or tape is subjected to violent mechanical action, e.g. stamping or creasing, we prefer to use from 0.25% to 10% by weight of a filler having a particle size range of from 0.1 to 2.0 microns and a very narrow distribution of particle size, e.g. titanium dioxide of particle size approximately 0.2 micron.

Our films or tapes may also be laminated to other materials which may or may not be themselves in the form of films. For example, they may be laminated to wood, to paper, to metals or to other thermoplastics.

The films or tapes so laminated may or may not contain any of the additives listed above and a particularly useful type of laminate is one in which a film or tape according to our invention and containing no additive is laminated to a second film which may be of polyethylene-1:2-diphenoxyethane-4:4'-dicarboxylate, of another polyester e.g. polyethylene terephthalate or of any other thermoplastic material, which second film contains such an additive. The effect of the additive may thus be obtained without necessarily incurring possibly undesirable other effects, e.g. a matte surface giving good write-on surface or surfaces may be obtained without unduly reducing transparency by laminating an unfilled film or tape so that it forms the central layer between two filled films or tapes according to our invention.

A further very useful class of laminates are those with thermoplastic materials which are heat sealable. Examples of such laminates are those with polyethylene, polyvinyl acetate, partially hydrolysed polyvinyl acetate, vinyl chloride/vinyl acetate copolymers, ethylene/vinyl acetate copolymers, butadiene/methyl methacrylate copolymers, butadiene/methyl methacrylate/styrene copolymers and methyl methacrylate/methacrylic acid polymers. A further group of thermoplastics which when laminated with our films or tapes confer not only heat sealability but also impermeability to water vapour and other gases include copolymers of vinylidene chloride with one or more of acrylonitrile, itaconic acid, acrylic acid or vinyl chloride. Any of the above heat sealable thermoplastics when laminated to our films or tapes may of course contain any of the additives listed above but antistatic agents (cationic, anionic or nonionic), antioxidants, dyes, pigments, lubricants, anti-blocking agents, ultra-violet light stabilisers and slip stabilisers and slip agents (finely divided solids or waxes) are among those additives which may conveniently be added to the heat sealable thermoplastic.

The films or tapes of our invention may also have their surface modified, e.g. by the application of a very thin coating of heat sealable, antistatic or an ultra-violet light stabilising material (although because of their high stability to ultra-violet light this is seldom required) or by the application of a slip coating comprising particulate material, e.g. of silica or alumino silicates, or of thermoplastic polymers such as polyvinyl chloride or polymethyl methacrylate. Slip coatings of polymethyl methacrylate of particle size from 0.1 micron to 2.0 microns are particularly useful since they increase the slip of the film or tape without markedly increasing its haziness. The surface may also be modified by embossing, by mechanical roughening or by sand blasting. Very thin reflective coatings of a metal such as aluminium may also be formed on the surface of our films or tapes. Such metallic coatings may range in thickness from $10^{-7}$ to $10^{-6}$ inches.

The methods used in the production of filled, laminated and surface modified films or tapes will now be described.

Fillers and other additives which do not undergo any chemical reaction with the polymer or polymer-forming reactants may preferably be incorporated into these materials and the resultant composition extruded to give the additive-containing film or tape. Such a procedure, especially when applied at the polymerization stage leads to a more uniform dispersion of the additive in the film or tape. Laminates comprising an outer layer or layers containing an additive may be produced by the extrusion through a multi-channel die in which polymer containing additive is fed to one or more channels and polymer without additive to the remaining channels. Such a film or tape and process for its production is described in our U.S. application Ser. No. 525,356 now Pat No. 3,515,626.

Laminates may be formed by first treating the films or tapes according to our invention with an adhesive such as low molecular weight polyesters and copolyesters used either alone or in conjunction with an isocyanate, and then applying an already formed film of the heat sealable thermoplastic material with the accompaniment of heat and pressure, e.g. between hot nip rollers. Such a process may conveniently be used in laminating our films or tapes to films of polyethylene or polypropylene, or to metallic foils, e.g. of tin or aluminium.

An alternative method of laminating our films or tapes to thermoplastic materials and particularly to heat sealable thermoplastic materials is to apply the material to our film or tape as a melt coating, from a solution or from aqueous dispersion. Although the adhesion of such coatings to the oriented films or tapes of our invention is high it may be necessary for particular coatings to pretreat the surface of the oriented film or tape to render it more receptive to the coating and thus produce a stronger adhesion between the base film and the heat seal coat. This may be done by a surface oxidation of the film or tape, e.g. by chemical oxidation with for example potassium dichromate, chloracetic acid or ozone, by flame treatment of the surface of the film or tape (with or without causing any melting of the film surface), or by corona discharge treatment in air or in another gas or mixture of gases, e.g. chlorine, sulphur dioxide or ozone. Thin coatings of a primer may be applied, e.g. alkyl titanates or polyalkylene imines.

One very effective method of obtaining an oriented film or tape, the surface of which is more receptive to a heat seal coating, is to apply to the unoriented or partly oriented film or tape a coating of a thermoplastic polymer at least fifty times thinner than the thickness of the unoriented film or tape, the thermoplastic polymer having a melting point lower than the orientation temperature and having at least one carbon atom with a polar substituent per every six carbons of the polymer chain. Such a process is described in our U.S. application Ser. No. 600,116, now abandoned, and this process may also be used to apply antistatic agents, ultra-violet stabilisers, antioxidants or slip coats to our films or tapes, or to improve their receptivity to dyes or printing inks over the already good characteristics which they have in this regard without such treatemnt.

To avoid pretreatment of the oriented film or tape prior to heat seal coating, the coating may be applied to the unoriented film or tape and then the orientation of the film or tape carried out. This leads to an excellent adhesion between the film or tape and the heat seal coat.

A further method of treating our films or tapes in order to make them more readily heat sealable is to subject their surface to a flame treatment which may be carried out by passing the oriented film or tape to be treated over a chilled roller while applying a flame or intense heat to the upper surface of the film or tape for a sufficient time to cause the surface of the film or tape to melt but for insufficient time to cause distortion of the film or tape. The film or tape following this treatment has an amorphous layer on the surface and can thus be heat sealed at a temperature of from 160° C. to 230° C. and using a pressure of 5 p.s.i. for 2 seconds give heat seal strengths of from 70 to 200 g./inch.

The increased modulus and yield strength of our films or tapes allows them to be successfully used for many applications in thicknesses considerably less than those employed for polyethylene terephthalate film or tape. In the following examples of uses for our films, which may be from 5 to 10,000 gauge thick, "gauge" means a unit of $10^{-5}$ inches.

They are particularly useful in the production of magnetic recording sound and video tapes in thicknesses as low as 25 gauge or even 5 gauge.

Our films and tapes may be used in electrical applications, for which they are particularly suitable since they have a high permittivity, for example in the production of capacitors for which film or tape generally of less than 100 gauge is used and in the case of very small capacitors which are increasingly being used in the electronics industry of thicknesses as low as 5 gauge. The films or tapes used for capacitors may contain fillers to improve their slip and so the ease of wrapping and a particularly suitable filler is titanium dioxide of particle size less than 1 micron. They may be used for cable lapping, for which a requirement is a high yield stress and film or tape of our invention of thickness as low as 10 gauge may be used in this application. They may be used in the production of other electrical and electronic components such as for example coil formers or in the production of chokes, coils and relays in which the film or tape forms an interlayer between the various windings of the electrical component. Another example of this type of use is in interphase insulation in polyphase electrical machines, e.g. three-phase electrical motors. Thicker films or tapes, e.g. from 500–2000 gauge, may be used for slot liners which are to be used at higher temperatures, because of the high resistance of our films and tapes to continued elevated temperature as compared with polyethylene terephthalate. Laminates between the present films or tapes and paper, and synthetic fibres, e.g. polyethylene terephthalate fibre, may be used for slot liners and slot closures in applications which require even higher working temperatures than does a small (½ h.p. and less) electric motor, e.g. up to 155° C. and laminates with glass fibre or with mica may be used in applications where temperatures up to 180° C. may be encountered. They may also be used in the production of printed circuits which may be used for example in the wiring of motor vehicles and in other applications in which it is desirable to have a flexible printed circuit unit. A similar application is in the production of ribbon cables which allow wiring to be placed, e.g. behind wallpaper. They may also be used in the production of insulating or other tapes which may be coated with an adhesive or a pressure sensitive adhesive and in the production of corrugated or embossed film or tape which latter is useful in the case of film or tape less than 200 gauge thick, e.g. in cable lapping since the corrugations or irregularities of the surface reduce any slippage between layers of the lapping which may occur on bending of the cable, and in winding of transformers which are then soaked in a varnish to increase the mechanical strength since the varnish can then permeate through the capillaries formed between successive layers of the embossed or corrugated film or tape.

The films of our invention can be used as a covering and/or backing for acoustic tiles, e.g. in hospitals where quietness combined with cleanliness is, of course of the greatest importance, and for lining hoses to impart chemical resistance to the hose. Such hoses are resistant to alkali as well as acid and thus represent an improvement over hoses lined with polyethylene terephthalate which is not particularly resistant to alkali. They may be laminated with felt or with bitumin to produce a material suitable for use as a roofing felt or in the construction of a damp course, or they may be laminated with wood, paper, metal or other materials when they can be used for decorative applications and in book binding. They may be used as gaskets. They may be used in the production of webbing, e.g. for upholstery or basket making and when perforated they can be used as a leather substitute, e.g. in the production of shoes, handbags and other leather-substituted goods. The perforated film may also be used in the production of surgical dressings.

They may be used in packaging, in thin gauges (e.g. 5–200 gauge) as tear tapes and, particularly in thick gauges e.g. from 750 gauge to 10,000 gauge (0.10 inch) as strapping tapes. They are also particularly suited for twist wrapping. They can be used for producing adhesive tapes and labels. They may be laminated to printed paper, e.g. to give weather-proof maps. Metallised film or tape may be used for many of the applications mentioned above and is particularly useful in producing labels and adhesive tapes, decorative laminates, e.g. with wood, paper or other plastics. For example a metallised film may be laminated to a formed strip of PVC and used as a replacement for chrome strip, e.g. in surrounding car windscreens. A particularly preferred use for metallised film or tape is as thin tapes or threads which can be woven into fabric to produce decorative effects. Metallised film or tape may also be used in the production of stamping foils in which the base film or tape is coated first with a release coating, then metallised, then coated with an adhesive which can be activated by heat; this laminate is then placed on the surface to be treated and heat applied to the desired part of the film or tape; when the laminate is stripped from the surface to be treated the metallised layer remains only over those parts which were heat treated. The process is used in particular in the process of gold lettering, but it may also be used for any other metal or other material which can be deposited as a thin layer on to the film or tape.

Films or tapes of thickness 150–750 gauge may be used as a base for other photographic and cinematographic films. They may also be used as a printing base, e.g. in silk screen printing. For these photographic applications a low shrinkage of our film is particularly useful. They may be used in book binding. They may be used as a base for carbon paper or for typewriter ribbons and owing to the high yield stress can be used in this application in thinner gauge than heretofore possible with polyethylene terephthalate film, thus allowing a longer length of film to be wound on a standard diameter roll of typewriter ribbon or for use in high speed printing heads, e.g. those attached to a computer where high tensile yield strengths are important. They may also be used for the punch tape to be fed to a computer or they may be used for ticker tape. They may be used in the form of a strip or discs to reinforce the holes in loose-leaf paper.

The films or tapes of our invention which have not been drawn to the maximum degree practically possible and preferably those which have been drawn less than three times may be shaped either at elevated temperatures e.g. 60° C. t. 150° C. by techniques such as vacuum forming or at room temperature by the press-forming techniques such as pressing, cupping, ironing and sinking which are well known in working sheet metal. Of these the most useful technique we find is vacuum forming especially for films or tapes of 50 to 300 gauge in thickness. Where unheat-treated (shrinkable) film or tape is used in vacuum forming, the film or tape must be cooled to below 60° C. before the vacuum is released to prevent shrinkage. A preferred use for such vacuum formed film or tape (whether shrinkable or crystallised) is in the production of blister packages.

Other uses include the production of rainwear, washable wallpaper, preferably with added filler to reduce the surface glossiness, measuring tapes for which they are suited because of their thermal stability, conveyor belts, particularly in uses where a high standard of hygiene is required, e.g. in battery chicken houses, as mould release agents, e.g. in the production of shaped articles from fibre glass, as a protective cover of the hull of ships and boats and as a thermal insulation material.

In the form of relatively thick sheets, i.e. 750–10,000 gauge (0.1 inch) they may be used for constructional panels and facing panels, e.g. in furniture, household appliances and vehicles, especially where particular strength is required in one direction.

The following examples illustrate but in no way limit the invention.

The relative viscosities of two samples of polyethylene-1:2-diphenoxyethane-4:4′-dicarboxylate dissolved as a 1% solution in ortho-chlorophenol were measured and found to be 1.96 and 2.11. These samples are hereinafter referred to as samples A and B respectively.

Polymer samples A and B were extruded from a 1¼″ Iddon extruder, the temperature at the die of the extruder being 313° C. The films were quenched on a water cooled metal roller immediately after their extrusion from the die. Films A and B were thus obtained.

EXAMPLES 1 TO 4

Film A (which was 640 gauge thick) was passed over hot rolls and so heated to 90° C. for 25 seconds. The film was then drawn at relatively low draw rates of from 48,000 to 100,000% per minute and at a temperature of 80° C. to the extents shown in the following table and its properties measured with results which are also shown in the table.

| Example No.: | Draw ratio | Thickness gauge | Longitudinal modulus (p.s.i.) | Longitudinal yield stress (p.s.i.) | Shrinkage (percent) after 1 min. at 200° C |
|---|---|---|---|---|---|
| 1 | 2.4:1 | 290 | 1×10⁶ | 24,000 | <0.5 |
| 2 | 3:1 | 250 | 1.4×10⁶ | 30,000 | <0.5 |
| 3 | 4:1 | 240 | 1.7×10⁶ | 45,000 | <0.5 |
| 4 | 5:1 | | Film ruptured | | |

EXAMPLES 5 TO 9

Film B was heat treated and then drawn under the same conditions as used for film A in Examples 1 to 4. The draw ratios used and the properties of the film produced are set out in the following table.

| Example No.: | Draw ratio | Thickness gauge | Longitudinal modulus (p.s.i.) | Longitudinal yield stress (p.s.i.) | Shrinkage (percent) after 1 min. at 200° C |
|---|---|---|---|---|---|
| 5 | 2.4:1 | 290 | 1×10⁶ | 24,000 | <0.5 |
| 6 | 3:1 | 250 | 1.4×10⁶ | 30,000 | <0.5 |
| 7 | 4:1 | 240 | 1.7×10⁶ | 45,000 | <0.5 |
| 8 | 5:1 | 180 | 2.3×10⁶ | 55,000 | <0.5 |
| 9 | 5:1 | 180 | 2.3×10⁶ | 66,500 | <0.5 |

The transverse tensile yield stress of Example 9 (which had the highest longitudinal yield stress) was 4,400 p.s.i. compared with a transverse yield stress of the unoriented film B of 7,000 p.s.i.

EXAMPLE 10

The films produced in Examples 1 to 9 were subjected to elevated temperatures for 5 minutes and their behaviour noted.

All the films fibrillated but while those produced in Examples 8 and 9 (draw ratio 5:1) fibrillated at 90° C. and those from Examples 3 and 7 fibrillated at 100° C. (draw ratio 4:1), temperatures in excess of 180° C. were required to fibrillate the films from Examples 1, 2, 5 and 6.

EXAMPLES 11 TO 13

Film B was heat treated at 180° C. for 30 seconds and then drawn at a temperature of 150° C. to draw ratios 3.7:1, 4.1:1 and 4.7:1. The properties of the films obtained are set out in the following table.

| Example No.: | Draw ratio | Longitudinal modulus (p.s.i.) | Longitudinal yield stress (p.s.i.) | Shrinkage (percent) after 1 min. at 200° C. |
|---|---|---|---|---|
| 11 | 3.7:1 | 1.5×10⁶ | 35,000 | <0.5 |
| 12 | 4.1:1 | 1.5×10⁶ | 38,000 | <0.5 |
| 13 | 4.7:1 | 2.0×10⁶ | 44,000 | <0.5 |

When heated to 120° C. for 5 minutes, none of the films produced in Examples 11 to 13 showed any tendency to fibrillate.

EXAMPLE 14

The undrawn film as used in Examples 11 to 13 was heat treated at 180° C. for 30 seconds and then drawn at a temperature of 130° C. to a draw ratio of 3.5:1. The drawn film had a longitudinal yield stress of 40,000 p.s.i. and when heated for 1 minute to a temperature of 120° C., showed no tendency to fibrillate.

EXAMPLES 15 TO 17

The undrawn film as used for Examples 11 to 14 was heat treated at 120° C. for 30 seconds and drawn at various temperatures and draw ratios as shown in the following table.

| Example No.: | Draw temperature, ° C. | Draw ratio | Longitudinal yield stress (p.s.i.) |
|---|---|---|---|
| 15 | 230 | 2.5:1 | 25,000 |
| 16 | 220 | 3.5:1 | 30,000 |
| 17 | 200 | 4.0:1 | 45,000 |

The films produced in Examples 15 to 17 show no tendency to fibrillate when heated to 120° C. for 5 minutes.

I claim:
1. A uniaxially oriented film or tape consisting essentially of polyethylene 1:2 diphenoxyethane-4:4' dicarboxylate having a relative viscosity as a 1% solution in O-chlorophenol between about 1.7 to 2.5, said film or tape being substantially non-fibrillatable at temperatures up to 120° C. and having in the longitudinal direction thereof a tensile yield strength of at least 20,000 p.s.i. and a moduli in bend of at least $0.8 \times 10^6$ p.s.i. and having in its transverse direction a tensile yield strength of at least 3,000 p.s.i.

2. The uniaxially oriented film or tape of claim 1 which is substantially non-fibrillatable at temperatures up to 80° C.

3. The uniaxially oriented film or tape of claim 1 having in its longitudinal direction a tensile yield strength of at least 45,000 p.s.i., a moduli of bend of at least $1.8 \times 10^6$ p.s.i. and a shrinkage when heated for 1 minute at 200° C. of less than 1%.

4. The uniaxially oriented film or tape of claim 1 having a thickness ranging from 5 to 10,000 gauge units, each of said gauge units being equal to $10^{-5}$ inches.

References Cited

UNITED STATES PATENTS

| | | | |
|---|---|---|---|
| 3,337,500 | 8/1967 | Schnegg et al. | 260—47C |
| 3,374,201 | 3/1968 | Wiener | 260—47C |
| 3,432,467 | 3/1969 | Davies et al. | 260—47C |
| 3,444,141 | 5/1969 | Shima | 260—47C |
| 2,718,666 | 9/1955 | Knox | 264—210 |
| 2,920,352 | 1/1960 | Miller et al. | 264—210 |
| 3,165,499 | 1/1965 | Alles | 161—402X |
| 3,256,379 | 6/1966 | Heffelfinger | 264—210 |

OTHER REFERENCES

Chemical Abstracts, vol. 65, 7342h.

ROBERT F. BURNETT, Primary Examiner

R. O. LINKER, JR., Assistant Examiner

U.S. Cl. X.R.

51—298; 161—231, 402; 260—47; 264—210